United States Patent
Amer (10) Patent No.: US 11,659,579 B2
(45) Date of Patent: *May 23, 2023

(54) INTERFERENCE MITIGATION TOOL (71) Applicant: T-Mobile USA, Inc., Bellevue, WA (US)

(72) Inventor: Mohamed Amer, Issaquah, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/649,495

(22) Filed: Jan. 31, 2022

(65) Prior Publication Data
US 2022/0159663 A1 May 19, 2022

Related U.S. Application Data (63) Continuation of application No. 16/849,606, filed on Apr. 15, 2020, now Pat. No. 11,240,824.

(51) Int. Cl.
| | |
|---|---|
| *H04W 16/14* | (2009.01) |
| *H04W 72/08* | (2009.01) |
| *H04B 17/345* | (2015.01) |
| *H04W 24/10* | (2009.01) |

(52) U.S. Cl.
CPC ........ *H04W 72/082* (2013.01); *H04B 17/345* (2015.01); *H04W 16/14* (2013.01); *H04W 24/10* (2013.01)

(58) Field of Classification Search
CPC ... H04W 72/082; H04W 16/14; H04W 24/10; H04W 24/02; H04W 16/10; H04B 17/345
See application file for complete search history.

(56) References Cited

U.S. PATENT DOCUMENTS

| | | | |
|---|---|---|---|
| 8,989,762 B1 | 3/2015 | Negus et al. | |
| 2017/0223012 A1 | 8/2017 | Abdelmonem | |
| 2017/0230128 A1* | 8/2017 | Abdelmonem | ..... H04W 72/085 |

* cited by examiner

*Primary Examiner* — Chuong A Ngo
(74) *Attorney, Agent, or Firm* — Summit Patents PC (57) ABSTRACT

Interference on an uplink between user equipment (UE) and a network site can disrupt the communications between the two. An interference mitigation tool can mitigate the effects such interference has on the communications between the UE and the network site by selecting a mitigation action for implementation at the network site. The interference mitigation tool can receive spectrum scan data from the network site to identify the presence of interference in an operating band of the network site. The interference mitigation tool can then determine possible mitigation actions and can select a mitigation action based on a variety of factors or criteria. Additionally, the interference mitigation tool can reverse previously implemented mitigation actions if the interference is no longer impacting the network site. Further, when selecting a mitigation action, the interference mitigation tool can also consider neighboring network sites and how the selected mitigation action would impact them.

20 Claims, 5 Drawing Sheets

INTERFERENCE MITIGATION TOOL

CROSS-REFERENCE TO RELATED APPLICATIONS

This application is a continuation of co-pending U.S. patent application Ser. No. 16/849,606, filed Apr. 15, 2020, the contents of which are herein incorporated by reference in their entirety.

BACKGROUND

Cellphones, other mobile devices and user equipment (UE) connect to a cellular network to provide voice, text and data services that a user can access using the UE. The UE and the cellular network communicate using radio transmissions that are sent and received through a network site, such as a cellphone tower. Other sources of radio transmissions can broadcast on a similar frequency or range of frequencies as the communications between UE and the network site. Operating on the similar frequency or range of frequencies can cause the broadcast from the other source of radio transmissions to interfere with the communications between the UE and the network site. This interference can prevent or disrupt an uplink between the network site and the UE, preventing the network site from clearly receiving communications from the UE. Depending on regulations governing transmissions used for communication between the UE and the network site, the network site may be required to accept the interference from the other sources of radio transmissions and also not interfere with the broadcast from the other sources of radio transmissions. The disruption caused by the interference can reduce the quality of the communications between the UE and the network site, causing voice calls to be dropped or cut-out, increasing packet losses during data transmissions, lower data transfer rates and other disruptions caused by the interference. These disruptions can frustrate users as their connection to the cellular network through the UE is prevented or hindered by the interference.

To prevent or minimize the interference caused by broadcasts from other radio sources, an operator of the network site, like a cellular services provider can take various mitigation actions. Often the mitigating actions include reducing or reshaping a coverage area associated with the network site so that the coverage area is no longer within the range of the broadcast from another radio source. Such interference mitigating actions can reduce the operating capacity and efficiency of the network site, adversely affecting the cellular services provider and their customers. In some cases, the interference can be to a sufficiently high level that the network site becomes unusable due to the interference.

There exists a need for systems and methods that can mitigate interference with a network site, thereby reducing the disruptions in communications between the UE and the network site.

DETAILED DESCRIPTION

Radio transmissions allow UEs to connect and communicate with a cellular network and to provide a user with various services, such as voice calls, text messaging and data services. These radio transmissions are between the UE and a network site, like a cellphone tower, and occur in a range of frequencies or an "operating band" of the network site. Other sources of radio transmissions can broadcast signals that are within or near the frequencies of the operating band of the network site, causing interference with the radio transmissions between the UE and the network site. This interference can disrupt communications between the UE and the network site, causing voice calls to be dropped, data packets to be lost and other communication disruptions. To mitigate the effect of the interference on the communications between the UE and the network site, an operator of the network site can use the interference mitigation systems and methods discussed herein. The described interference mitigation systems and methods detect interference in the operating band of the network site and select a mitigation action that can be implemented at the network site to mitigate the interference. By mitigating the interference, there is a reduced disruption of the communications between the UE and the network site. This can prevent or reduce the likelihood of a dropped or interrupted voice call, a slowed data transmissions or other disruptions of communications between the UE and the network site.

The described interference mitigation systems and methods can be applied to a group of network sites within an area or neighborhood. The neighborhood can be a geographical area and the network site within the geographical area are considered as being part of the neighborhood. By applying the mitigation systems and methods to the neighborhood of network sites, the selection of mitigation action for each of the network sites can include a consideration of the impact the selected mitigation action will have on the operating efficiency of the neighborhood of network sites as a whole. This can prevent network inefficiencies that may be caused by mitigating interference on an individual network site basis.

Figure 1:
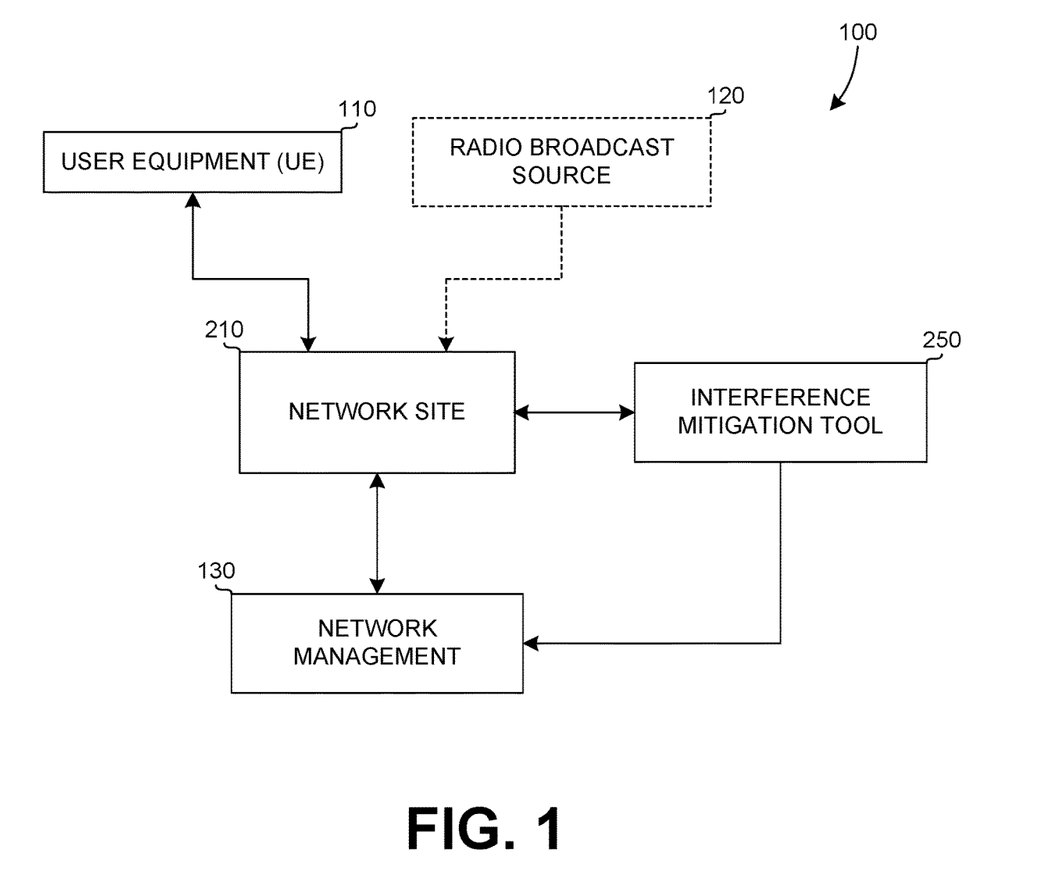
FIG. 1 is a block diagram of an example interference mitigation system.

FIG. 1 illustrates an example communications system 100 that includes a network site 210 that is part of a cellular telephone network. The network site 210 exchanges radio communications with user equipment (UE) 110 to provide the UE access to various functions and features of the cellular telephone network, such as voice calling, text messaging, data or internet services or other features of the cellular network. The network site 210 operates within one or more operating bands that are ranges of frequencies within which the network site 210 sends and receives radio transmissions. The radio communications exchanged between the UE 110 and the network site 210 occur in one or more frequencies or ranges of the operating band of the network site 210.

During operation, the network site 210 receives communications from the UE 110 in a predetermined frequency or frequency range. However, the network site 210 is also able to receive other radio transmissions that are within the same frequency or frequency range in which the UE 110 is communicating with the network site 210. A radio broadcast source 120, like a television's broadcast antenna can broadcast a radio transmission having a similar or the same frequency as that being used for communication between the UE 110 and the network site 210. Because they are on the same or similar frequency, the radio transmission by the radio broadcast source 120 can interfere with the network site 210 receiving communications from the UE 110. The interference can cause the communications between the UE 110 and the network site 210 to be disrupted. Such disruptions can be frustrating for both the user and a cellular network provider that operates the network site 210.

An interference mitigation tool 250 assists in mitigating or reducing the interference caused by radio transmissions from the radio broadcast source 120. To identify the presence of interference, the network site 210 provides the interference mitigation tool 250 various data and information regarding radio signals received or detected within the operating band(s) of the network site 210. The interference mitigation tool 250 analyzes the received data for interference and selects one or more mitigation actions that can be implemented to mitigate the interference caused by the radio broadcast source 120. After the one or more mitigation actions have been selected by the interference mitigation tool 250, they can be output or transmitted to network management 130. The network management 130 can then cause the mitigation actions to be implemented at the network site 210 by altering one or more operating parameters of the network site 210. Alternatively, the interference mitigation tool 250 can generate instructions to cause the network site 210 to be reconfigured based on the one or more mitigation actions. The interference mitigation tool 250 can transmit these instructions to the network site 210 to directly cause the mitigation actions to be taken.

The network management 130 can be a system, an office, a central location or other management entity that manages the various operating parameters of the network site 210. The interference mitigation tool 250 can be located at the network management 130 or can be coupled to a network that communicates with one or more of the network sites 210 that are managed by the network management 130. As previously discussed, the interference mitigation tool 250 can output the one or more mitigation actions to the network management 130. The selected mitigation actions can be optionally reviewed by a network engineer of the network management 130. The network engineer can choose to approve, modify or deny the implementation of the mitigation actions selected by the interference mitigation tool 250. Once the mitigation actions are finalized or approved by the network management 130, the network management can provide instructions to the network site 210 to cause the network site 210 to implement the mitigation actions. Alternatively, the network management 130 can provide the approval for the mitigation actions to the interference mitigation tool 250, which can then generate and transmit reconfiguring instructions to the network site 210 to implement the mitigation actions.

The network site 210 receives from the interference mitigation tool 250 or the network management 130 the instructions to reconfigure and implement the mitigation actions selected by the interference mitigation tool 250. Based on the instructions, one or more operating parameters of the network site 210 are altered to cause the network site 210 to be reconfigured. Once reconfigured, communications between the UE 110 and the network site 210 are less effected by interference that may be caused by radio transmissions from the radio broadcast source 120.

Various factors can influence whether the network site 210 experiences interference caused by the radio broadcast source 120. For example, weather, humidity, and other factors can affect the propagation of the radio transmissions of the radio broadcast source 120, causing the network site 210 to receive the radio transmissions or not. Since the interference caused by the radio broadcast source 120 may be intermittent, the interference mitigation tool 250 can regularly check if further mitigation actions need to be implemented or if previously implemented mitigation action is no longer needed. By performing the mitigation process repeatedly, the interference mitigation tool 250 can assist in operating the network site 210 in an efficient manner so that its capabilities are not unnecessarily hindered by previously implemented mitigation actions.

Figure 2:
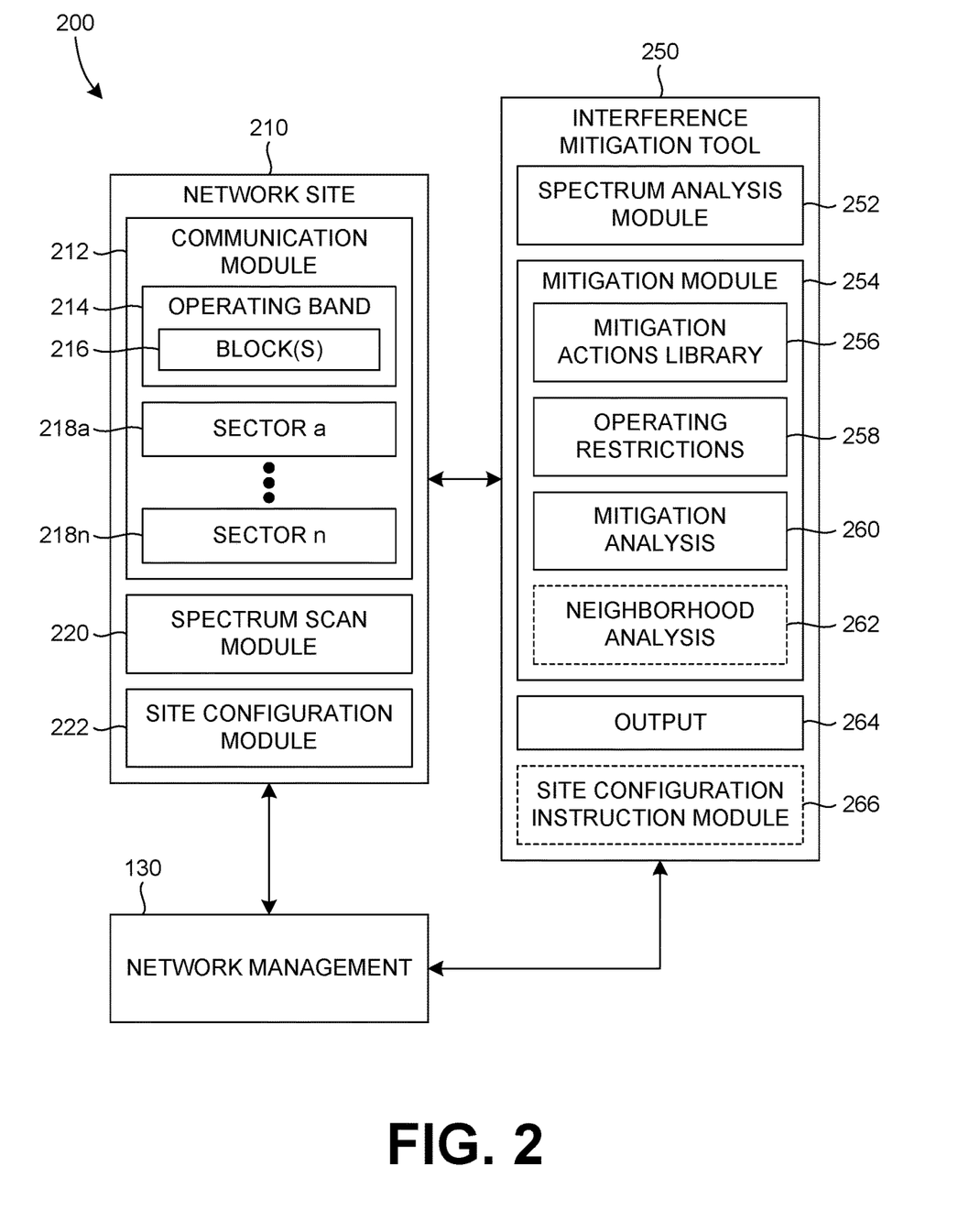
FIG. 2 is a block diagram of an example interference mitigation process.

FIG. 2 illustrates an example interference mitigation system 200 that includes the network site 210, the interference mitigation tool 250 and the network management 130. As previously discussed, the interference mitigation tool 250 receives and analyzes data from the network site 210 to detect and evaluate the extent of any interference the network site 210 is experiencing, such as from the radio broadcast source 120 of FIG. 1. The interference mitigation tool 250 can select one or more mitigation actions that can be implemented to mitigate the interference at the network site 210. The network site 210 can be reconfigured by the interference mitigation tool 250 or by the network management 130 to implement the one or more selected mitigation actions.

The network site 210 includes a communication module 212, a spectrum scan module 220 and a site configuration module 222. The communication module 212 sends and receives radio communications with the UE, such as UE 110 of FIG. 1. The radio communications allow the UE to communicate with the cellular network of which the network site 210 is a part. This allows the UE to access various features of the cellular network like make voice calls, text messaging services, data services and other features.

The communication module 212 communicates with the UE by sending and receiving the radio transmissions within an operating band 214. The operating band 214 is a range of frequencies that the network site 210 uses to send and receive radio transmissions. The network site 210 can have multiple operating bands 214 depending on the cellular communications technology(s) the network site 210 supports, such as 3G, 4G, LTE, 5G and other cellular communication technologies. For example, the operating band 214 of the 5G cellular communication technology can be a 600 MHz band. The operating band 214 can be divided into block(s) 216 that are portions of the operating band 214, such as 10 MHz portions of the operating band 214. Additionally, the blocks 216 of the operating band 214 can be further subdivided into smaller ranges of frequencies. When establishing a connection with the network site 210, the UE can be instructed to communicate with the network site 210 within one of the blocks 216 of the operating band 214. By instructing the UE to communicate in a particular block 216, the network site 210 can manage the traffic it is sending and receiving with various connected UEs.

The communication module 212 also includes one or more sectors 218a-218n. The network site 210 has a coverage area that is the area within which the network site 210 can communicate with UE. The coverage area is subdivided into one or more sectors 218a-218n and the network site 210 can manage the operating parameters of each of the one or more sectors 218a-218n independently from the others. For example, the sectors 218a-218n of the network site 210 can communicate on the same or different blocks 216 of the operating band 214. On the network site 210, like a cellphone tower the one or more sectors 218a-218n are indicated by the various directions the directional antennas of the network site 210 are aligned in. In the past, cellphone towers often had three sectors resulting in the typical, triangular arrangement of antennas. However, as cellular network traffic has increased, many network sites 210 now have more than three sectors, such as 4-6 sectors to better serve the increased volume of cellular network traffic.

The spectrum scan module 220 generates spectrum scan data that is provided to the interference mitigation tool 250 for analysis. The spectrum scan data is frequency and power data regarding all of the radio transmissions the network site 210 receives within a range of frequencies, such as operating band 214 of the network site 210. The range of frequencies the spectrum scan is being performed can be divided into increments and the spectrum scan data includes a measured loudness or power for each increment of the range of frequencies. For example, the spectrum scan data can be for a frequency range that spans 660 MHz to 690 MHz, and the spectrum scan data can include a measured loudness or power for each 1 MHz increment of the frequency range. This spectrum scan data can be represented as a table or data set. The table or data set associates each 1 MHz increment with a measurement of the power or loudness of all the radio transmissions received for that 1 MHz increment. In an alternative, the spectrum scan data can be represented as a trace or visual representation of all of the radio transmissions received within the range of frequencies the spectrum scan is performed for. The trace or visual representation can be a plot or graph, with the 600 MHz to 690 MHz frequency range along one axis and the measured power or loudness along a second axis.

The spectrum scan data can be generated by the spectrum scan module 220 according to a schedule or when requested. For example, the spectrum scan module 220 can be scheduled to generate the spectrum scan data once a day. In another example, the interference mitigation tool 250 can request the spectrum scan data from the network site 210, causing the spectrum scan module 220 to generate the requested spectrum scan data. The spectrum scan module 220 can be included in the existing equipment of the network site 210 or can be added to the network site 210 to generate the spectrum scan data.

The spectrum scan data can be generated for each of the sectors 218a-218n individually and includes a frequency and a loudness or power for radio transmissions that the network site 210 receives. To generate the spectrum scan data, the spectrum scan module 220 scans the operating band 214 for any radio transmissions and records the data relating to the received radio transmissions. The collected spectrum scan data can be divided by the blocks 216 of the operating band 214 and by the sectors 218a-218n of the network site 210. Once collected, the spectrum scan module 220 can provide the spectrum scan data to the interference mitigation tool 250 for analysis.

The site configuration module 222 can control one or more operating parameters of the network site 210 and can cause the network site 210 to be reconfigured by altering one or more operating parameters of the network site 210. The interference mitigation tool 250 or the network management 130 can provide instructions to the site configuration module 222 to change the one or more operating parameters of the network site 210. By altering one or more operating parameters, the interference mitigation tool 250 or network management 130 can alter the operating characteristics of the network site 210 to mitigate interference experienced by the network site 210, such as interference caused by the radio broadcast source 120 of FIG. 1.

The interference mitigation tool 250 includes a spectrum analysis module 252, a mitigation module 254, an output 264, and an optional site configuration instruction module 266. The interference mitigation tool 250 receives the spectrum scan data from the network site 210 and the spectrum analysis module 252 analyzes the spectrum scan data to identify interference by comparing the loudness or power measurements of the spectrum scan data to a threshold, such as a predetermined loudness or power. Frequencies of the spectrum scan data that have measured power levels that exceed the predetermined threshold can be identified as frequencies that have interference. If interference is present, the mitigation module 254 selects one or more mitigation actions that can be implemented to mitigate the interference the network site 210 is experiencing.

The spectrum analysis module 252 receives the spectrum scan data from the spectrum scan module 220 of the network site 210 and analyzes the spectrum scan data to determine the presence of interference in the spectrum scan data. To identify the interference, the spectrum analysis module 252 can identify radio transmissions in the spectrum scan data that exceed a threshold loudness or power. As previously discussed, the spectrum scan data includes measured loudness or power data for all of the radio transmissions received by the network site 210 within a range of frequencies. The measured loudness or power data is associated with an increment of the range of frequencies, such as a measured loudness or power for each 1 MHz increment of the range of frequencies. The spectrum analysis module 252 can analyze each increment and determine if the measured loudness or power of the radio transmissions received within that increment exceed a predetermined threshold. Increments of the range of frequencies that have a measured loudness or power that exceeds the predetermined threshold can be identified as frequencies that are experiencing interference. For example, a transmission received from the radio broadcast source 120 that causes interference with the network site 210 will a relatively large signature or high power recorded in the spectrum scan data. For the frequencies associated with the transmission, the spectrum scan data will have a measured loudness or power that exceeds the predetermined threshold. The spectrum analysis module 252 can identify these frequencies in the spectrum scan data as frequencies that are experiencing interference. Alternatively or additionally, the spectrum analysis module 252 can use other analysis to identify interference in the spectrum scan data, such as other signal processing techniques.

The spectrum analysis module 252 also determines which of the blocks 216 and sectors 218a-218n of the network site 210 are affected by the interference based on the analysis of the spectrum scan data. Additionally, the spectrum analysis module 252 can classify the interference and its effects based on the spectrum scan data, such as whether the interference is severe, moderate or minimal. Severe interference can indicate that the amount of interference is so great that communication from the UE to the network site 210 are not able to be received by the network site 210, preventing the UE from connecting to the network site 210. Moderate interference can indicate that the amount of interference is likely to disrupt communications from the UE and the network site 210, such as cause voice calls to drop. Minimal interference can indicate that the amount of interference will degrade the quality of communications from the UE to the network site 210, such as cause voice calls to cut-out or sound of poor quality. To classify the interference, the spectrum analysis module 252 can have a predetermined loudness or power threshold associated with each classification of the interference. When performing the analysis of the spectrum scan data, the spectrum analysis module 252 can compare the measured loudness or power associated to the predetermined thresholds. The classification of the interference is then based on which of the associated thresholds the measured loudness or power exceeds. For example, the spectrum analysis module 252 can have a −100 dB loudness threshold for severe interference, a −110 dB loudness threshold for moderate interference and a −115 dB loudness threshold for minimal interference. If the measured loudness of the radio transmissions received on a frequency of the spectrum scan data is greater than −100 dB, the frequency is classified as experiencing severe interference. Similarly, if the measured loudness is between −110 dB and −100 dB the frequency is classified as experiencing moderate interference, and if the measured loudness is between −115 dB and −110 dB the frequency is classified as experiencing minimal interference. If the measured loudness is less than −115 dB, the frequency can be classified as experiencing no interference. Using the predetermined interference classification thresholds, spectrum analysis module 252 can compare a measured loudness or power level of a frequency in the spectrum scan data, such as a −112 dB loudness at 670 MHz, to the thresholds to classify the interference. In this example, the interference at the 670 MHz frequency would be classified as moderate. Alternatively or additionally, the interference can be quantified by calculating a value for the interference, such as a percentage of a block 216 that experiences the interference. The spectrum analysis module 252 can then provide interference information to the mitigation module 254. The interference information can include the blocks 216 and sectors 218a-218n and the frequency(s) and signal power associated with the interference along with a classification of the interference.

The mitigation module 254 receives the interference information from the spectrum analysis module 252 and selects one or more mitigation actions that can be implemented to mitigate the interference experienced by the network site 210. To do so, the mitigation module 254 includes a mitigation actions library 256, operating restrictions 258, mitigation analysis 260 and an optional neighborhood analysis 262.

The mitigation actions library 256 is a collection of all the possible mitigation actions from which the mitigation module 254 can select. Example mitigation actions can include frequency shifting, block shifting, uplink blanking, bandwidth reduction, Physical Uplink Control Channel (PUCCH) reconfiguration, Physical Random Access Channel (PRACH) reconfiguration, down tilting, and other mitigation actions. There may be restrictions associated with one or more of the various mitigation actions of the mitigation actions library 256 that prevent one or more of mitigation actions from being able to be implemented in certain situations. The mitigation analysis 260 can consider these restrictions and other factors when selecting the one or more mitigation actions.

The frequency shifting mitigation action shifts the frequency or frequencies used by the UE and the network site 210 for communication. If the interference is present in a frequency or range of frequencies, the frequency shifting mitigation action can shift the frequencies used for communications between the UE and the network site 210 to frequencies that are not affected by the interference or not affected as much by the interference. Similarly, the block shifting mitigation action can shift the block(s) 216 of the operating band 214 that are used by the UE and network site 210 for communication. The communications between the UE and the network site 210 can be shifted to block(s) 216 that are not affected by the interference or not affected as much by the interference.

The uplink blanking mitigation action blocks or prevents the UE from transmitting to the network site 210 over a specific frequency(s) or blocks 216 of the operating band 214. For example, if the network site 210 is experiencing interference from the radio broadcast source 120 on a frequency(s) or blocks 216, it may be unable to "hear" or receive transmissions from the UE 110 that are sent in the same frequency(s) or blocks 216 as the interference. By implementing uplink blanking, the network site 210 can instruct UE not to transmit over the frequenc(ies) interfered with or the blocks 216 of the operating band 214.

The bandwidth reduction mitigation action reduces the bandwidth or frequency range in which the UE communicates with the network site 210. The bandwidth reduction can reduce the bandwidth of a block 216 for communication between the UE and the network site 210. The reduction in bandwidth can reduce the number of UEs that can connect and communicate with the network site 210 using the block 216 to which the bandwidth reduction has been applied. This minimizes the number of UEs affected by the interference and can allow the network site to be better able to serve the connected UE since it does not have to serve as many UEs due to the bandwidth reduction.

The Physical Uplink Control Channel (PUCCH) and Physical Random Access Channel (PRACH) are signaling channels that the UE and the network site 210 use to coordinate communications. Interference on the frequency(s) associated with the PUCCH or PRACH can prevent or inhibit communications between the UE and the network site 210, since the interference can prevent the UE and network site 210 from coordinating their communications. If a frequenc(ies) associated with the PUCCH or PRACH is experiencing interference, the PUCCH or PRACH reconfiguration mitigation actions can shift the PUCCH or PRACH to another frequenc(ies). Often, the frequenc(ies) available for the PUCCH and PRACH are predetermined by the manufacture of the equipment of the network site 210. The PUCCH and PRACH reconfiguration mitigation actions can move the PUCCH or PRACH to another of these predetermined frequenc(ies) in response to the current PUCCH or PRACH frequenc(ies).

The down tilting mitigation action is the physical or electronic shifting of the coverage area of a sector 218a-218n of the network site 210. Down tilting a sector 218a-218n reduces the coverage area of the sector 218a-218n by reducing the distance within which the sector 218a-218n can send and receive signals. The down tilting of the sector 218a-218n can alter the coverage area so that the sector 218a-218n is no longer receiving interference or reduces the amount of interference the sector 218a-218n receives.

The operating restrictions 258 are various restrictions that limit or affect the operation of the network site 210. For example, the operating restrictions 258 can be limits, thresholds or ranges of values for one or more operating parameters of the network site 210 is required for compliance. The operating restrictions 258 can include government regulations that dictate the approved operations of the network site 210. The operating restrictions 258 can also include restrictions that the cellular services provider, network site 210 operator, or others place on the operation of the network site 210. An example operating restriction 258 can include a restriction that the network site 210 cannot interfere with the broadcast from the radio transmission source, like 120 of FIG. 1. Another example operating restriction 258 can include the approved blocks 216 on which the network site 210 can operate. The operating restrictions 258 can be specific to individual network sites 210 or groups of network sites, and the interference mitigation tool 250 can maintain or have access to a database that includes the operating restrictions 258 for one or more network sites 210. The mitigation analysis 260 can access and consider the operating restrictions 258 when selecting one or more mitigation actions, since the operating restrictions 258 may limit the mitigation actions that are allowed to be implemented.

The mitigation analysis 260 processes various information to select one or more mitigation actions that are to be implemented at the network site 210 to mitigate the interference experienced by the network site 210. The various information considered by the mitigation analysis 260 can include the interference information from the spectrum analysis module 252, the available mitigation actions of the mitigation actions library 256, the operating restrictions 258, and other considerations. The mitigation analysis 260 evaluates the available mitigation actions in the mitigation actions library 256 and the other information to select the one or more mitigation actions to be implemented at the network site 210.

Initially, the mitigation analysis 260 receives the interference information from the spectrum analysis module 252. After determining that the network site 210 is experiencing interference, the mitigation analysis 260 can proceed to select possible mitigation actions that can be implemented to mitigate the effects of the interference on the network site 210. The mitigation analysis 260 can identify all the possible mitigation actions of the mitigation action library 256 that can be implemented at the network site 210 based on the restrictions associated with the mitigation actions and operating characteristics of the network site. For example, if the interference is identified as occurring in one of the available PUCCHs or PRACHs of the network site 210, the PUCCH or PRACH reconfiguration mitigation actions can be excluded from the list of possible mitigation actions since they cannot be reconfigured and moved to a frequency that is experiencing interference. In this manner, the mitigation analysis 260 identifies all of the possible mitigation actions that can be implemented. This reduces the possible mitigation actions that need to be analyzed for their effectiveness in mitigating the interference experienced by the network site 210.

After identifying the possible mitigation actions, the mitigation analysis 260 can evaluate each of the actions for an interference improvement, i.e. their effectiveness in reducing the interference. The interference improvement or effectiveness of each of the possible mitigation actions can be a calculated value or a classification of the amount by which the experienced interference will be mitigated by implementing each of the possible mitigation actions. To determine the network improvement or effectiveness, the mitigation analysis 260 can model or evaluate how effective each of the possible mitigation actions will be in mitigating the interference experienced by the network site 210. To evaluate the effectiveness, the mitigation analysis module 260 can use historical data regarding previous implementations of each of the possible mitigation actions and as associated amount by which the interference was reduced for each of the possible mitigation actions. This historical data can be stored in a database of the interference mitigation tool or in a storage location accessible by the mitigation analysis module 260. The mitigation analysis module 260 can use an algorithm or other modeling process to evaluate the historical data and determine an estimated effectiveness for each of the possible mitigation actions the mitigation analysis module 26 is considering for implementation. In an example, the algorithm can average the historical amounts by which the interference was reduced for each of the possible mitigation actions. The averages can then be compared to identify or rank the possible mitigation actions by their estimated effectiveness, with possible mitigation actions having a higher average being ranked higher or identified to be more effective. The evaluation can provide an indication of an amount of interference that would be mitigated for each of the possible mitigation actions. This evaluation can be done to determine if a mitigation action should be implemented or if an alternative mitigation action would be more effective.

The evaluation of the mitigation actions can also consider the classification of the interference. For example, if the interference would still be classified as severe once a mitigation action is implemented, that mitigation action can be determined to be not effective enough. In response, the mitigation analysis module 260 can select an alternative mitigation action or a combination of mitigation actions to implement. The alternative or combination of mitigation actions can be evaluated to determine their effectiveness and if their implementation would reduce the interference enough to no longer be classified as sever. In another example, the evaluation of the mitigation action can indicate that the mitigation action would mitigate the interference from severe to moderate, which is an effective improvement. Using the above described evaluation, the mitigation analysis module 260 can determine an estimated effectiveness of the mitigation action, including an estimate of the amount by which the interference would be reduced by implementing the mitigation action. The mitigation analysis module 260 can apply the estimated amount of interference reduction to the current measured loudness of the interference, and using the predetermined interference classification thresholds, determine an estimated classification of the interference after implementation of the mitigation action. If the estimated classification of the interference after implementation of the mitigation action is reduced in comparison to the current classification of the interference, the mitigation analysis module 260 can determine that the mitigation action is an effective improvement.

Additionally, the evaluation of the interference improvement or effectiveness of the mitigation actions can optionally include calculating a percent or value associated with the improvement. For example, a mitigation action can be evaluated as having a 5% improvement in mitigating the interference experienced by the network site. The mitigation analysis 260 can use the calculated interference improvement or evaluated effectiveness of the mitigation actions to weight the potential mitigation actions with the most effective mitigation actions being assigned a greater weight. In this manner, the mitigation analysis 260 can rank the available mitigation actions.

After determining the available mitigation actions and evaluating the available mitigation actions, the mitigation analysis 260 can check and identify if there are conflicts between the available mitigation actions and the operating restrictions 258. If implementing any of the available mitigation actions would cause the network site 210 to violate an operating restriction 258, the mitigation action can be discarded as an option that the mitigation analysis 260 can select. For example, an operating restriction 258 may limit the blocks 216 on which the network site 210 can operate. In the example, an available mitigation action is to shift the network site 210 to operate in different blocks 216 of the operating band 214. However, if doing so would shift the operation of the network site 210 into a block 216 on which the network site 210 is not permitted to operate, then the block shifting mitigation action can be discarded. Similarly, other mitigation action that would cause the network site 210 to violate an operating restriction 258 can be disregarded as a possible mitigation action to implement.

After limiting the available mitigation actions to those that can be implemented, the mitigation analysis 260 can select one or more mitigation actions to be implemented to mitigate the interference experienced by the network site 210. The mitigation analysis 260 can consider various factors when selecting the one or more mitigation actions, such as the effectiveness of each of the available mitigation actions and an impact each of the available mitigation actions will have on the operation of the network site 210.

The effectiveness of each of the available mitigation actions can be a characteristic of effectiveness, such as strongly effective, moderately effective or minimally effective. For example, a strongly effective characteristic associated with the mitigation action can indicate that the mitigation action would be strongly effective in mitigating the interference experienced by the network site 210. Similarly, the moderately and minimally effective characteristics can indicate that the mitigation action would be moderately or minimally effective in mitigating the interference experienced by the network site 210, respectively.

Some of the available mitigation actions may cause a reduction in the operating efficiency of the network site 210 when implemented. The reduced operating efficiency of the network site 210 can reduce the quantity of UEs the network site 210 can serve or reduce the coverage area of the network site 210. The mitigation analysis 260 can select the one or more mitigation actions to limit the impact the mitigation actions will have on the operating efficiency of the network site 210 and the effectiveness of the one or more mitigation actions.

To assist in selecting the one or more mitigation actions, the available mitigation actions can be assigned a hierarchal order based on their effectiveness and their impact on the operating efficiency of the network site. In doing so, the mitigation analysis 260 can select the one or more mitigation actions that will mitigate the interference experienced by the network site 210 while limiting the impact of the one or more mitigation actions on the operating efficiency of the network site 210.

The mitigation analysis 260 is applied to each of the sectors 218a-218n of the network site 210 with the mitigation analysis 260 selecting one or more mitigation actions for each of the sectors 218a-218n of the network site 210. By mitigating the interference for each of the sectors 218a-218n individually, the impact of the mitigation actions on the overall operating efficiency of the network site 210 can be reduced or minimized. A graphical representation of an example mitigation analysis 260 is shown and described with respect to FIG. 3. Alternatively, the mitigation analysis 260 can be applied to all of the sectors 218a-218n of the network site 210. In this case, the one or more mitigation actions selected by the mitigation analysis 260 are implemented by all of the sectors 218a-218n of the network site.

The optional neighborhood analysis 262 is a further analysis performed before the one or more mitigation actions are selected to be implemented. The neighborhood analysis 262 considers the mitigation actions of a group of network sites within a geographical area or neighborhood. The mitigation actions implemented by one network site 210 can be different than the mitigation actions implemented at a neighboring or nearby network site. The implemented mitigation actions can mitigate the interference experienced by each of the network sites, but may decrease an overall operating efficiency of the cellular network in that area. For example, the mitigation action implemented by a first network site can be a block shift. The block shift can cause the first network site to operate on a different block than a second, nearby network site. While the network sites can operate on different blocks, it does require additional signaling when the UE transfers from communicating with the first network site to communicating with the second network site. This additional signaling increases the burden on the cellular network, which can reduce its operating efficiency. The neighborhood analysis 262 of the interference mitigation tool 250 can evaluate the effects the mitigation actions of the individual network sites has on the operating efficiency of the group of network sites as a whole. This can prevent inadvertent operating inefficiencies that may arise from the mitigation actions implemented at individual network sites. The neighborhood analysis 262 can alter the weight or hierarchal order of the available mitigation actions prior to the selection of the one or more mitigation actions by the mitigation analysis 260. The mitigation analysis 262 can then include the neighborhood analysis 262 when selecting the one or more mitigation actions.

After the mitigation analysis 260 of the mitigation module 254 has selected one or more mitigation actions to be implemented at one or more sectors 218a-218n of the network site 210, the selected mitigation actions can be output 264 by the interference mitigation tool 250. The output 264 can include transmitting the selected mitigation actions to the network management 130. As previously discussed, the network management 130 can evaluate the selected mitigation actions output by the interference mitigation tool 250 and can determine whether the selected mitigation actions should be implemented at the network site 210. In addition, the interference mitigation tool 250 can also output 264 the spectrum scan data of the interference or other information to the network management 130 to assist in the determining whether the selected mitigation actions should be implemented. The network management 130, such as a network technician, can evaluate the spectrum scan data or other information and the selected mitigation actions to determine whether to implement the selected mitigation actions. The spectrum scan data or other information can provide additional context and information to the network technician, which they can use when evaluating whether or not to implement the selected mitigation actions.

The interference mitigation tool 250 can optionally include a site configuration instruction module 266. The site configuration instruction module 266 can generate instructions for the network site 210 that cause the selected mitigation actions to be implemented at the network site 210. The selected mitigation actions are implemented by altering one or more operating parameters of the network site 210. The site configuration module 266 can include a listing of the possible mitigation actions and the operating parameters associated with the implementation of each of the possible mitigation actions. The site configuration instruction module 266 can use this listing to determine the one or more operating parameters to be altered to implement the selected mitigation actions. Additionally, the listing can include instructions or a process the site configuration module 266 can use to determine the settings for the one or more operating parameters to be altered. The site configuration module 266 can use these instructions to determine the amount by which the one or more operating parameters are to be altered by or a setting for the one or more operating parameters. The site configuration instruction module 266 can then generate the instructions to alter the one or more operating parameters to implement the selected mitigation actions. The instructions are compiled into programming language that the site configuration module 222 can execute. The instructions generated by the site configuration instruction module 266 are provided to the site configuration module 222 of the network site 210. Using the instructions, the site configuration module 222 alters the one or more operating parameters of the network site 210a to reconfigure the network site 210 and implement the selected mitigation actions. The instructions to reconfigure the network site 210 based on the selected mitigation actions can be automatically generated and provided to the network site 210 by the interference mitigation tool 250. Alternatively, as previously discussed, network management 130 can review and approve the selected mitigation actions. The network management 130 can provide the approval of the selected mitigation actions to the interference mitigation tool 250 and the site configuration instruction module 266 can generate and transmit the instructions to cause the selected mitigation actions to be implemented at the network site 210.

The interference mitigation tool 250 can be a stand-alone or integrated system of the cellular network. This allows the interference mitigation tool 250 to connect to and perform interference mitigation for multiple network sites 210 of the cellular network. Alternatively, the interference mitigation tool 250 can be a program that is installed in a system that is connected to one or more network sites 210 of the cellular network. In an example, the interference mitigation tool 250 can be part of the network management 130, to provide interference mitigation for the network sites 210 that are managed by the network management 130. In another alternative, the network site 210 can include the interference mitigation tool 250 that performs the interference mitigation for the network site 210. In this manner, each of the network sites of the cellular network can include their own interference mitigation tool 250 to mitigate the impact of the interference experienced by the network sites.

The interference mitigation tool 250 can perform interference mitigation for the network site 210 on a schedule or when requested. For example, the interference mitigation tool 250 can be scheduled to perform interference mitigation on a daily or other scheduled basis for the network site 210. Alternatively, the interference mitigation by the interference mitigation tool 250 can be performed when requested, such as when requested by the network management 130. Since the interference mitigation tool 250 can run autonomously, it can perform interference mitigation for multiple network sites 210 concurrently or within a certain amount of time, such as 2,000-6,000 network sites per hour. The speed, efficiency and effectiveness of the interference mitigation tool 250 allows interference mitigation to be performed for multiple network sites, which mitigates the interference of sizeable portions of the cellular network. The mitigated interference improves a user's experience with the cellular network as their use of the cellular network is not disrupted by interference or the interruptions are reduced or minimized.

Additionally, the interference mitigation for the network site 210 can be performed repeatedly by the interference mitigation tool 250, such as on a schedule like discussed previously. By performing the interference mitigation repeatedly, the interference mitigation tool 250 can undo previously implemented mitigation actions if the mitigation actions are no longer needed. For example, during an initial interference mitigation the interference mitigation tool can select one or more mitigation actions to be implemented for the network site 210. In a later interference mitigation, the spectrum analysis module 252 of the interference mitigation tool 250 can determine that the interference is no longer present based on the spectrum scan data. The interference mitigation tool 250 can track mitigation actions that have been implemented at the network site 210 and can undo one or more of the implemented mitigation actions when it determines the interference is no longer impacting the network site 210. By undoing unneeded implemented mitigation actions, the operating efficiency of the network site 210 can be increased or maximized.

As previously discussed, the network management 130 can receive the selected mitigation actions from the interference mitigation tool 250 for approval. The network management 130 can approve, modify or deny the implementation of the selected mitigation actions. In an example, a network technician of the network management 130 can manually review a listing of the selected mitigation actions for each of the sectors 218a-218n of the network site 210. The network technician can approve the selected mitigation actions and can communicate with the site configuration module 222 of the network site 210 to implement the selected mitigation actions for each of the sectors 218a-218n. Alternatively, the approval for the selected mitigation actions can be provided to the interference mitigation tool 250 and the site configuration instruction module 266 can generate the instructions to reconfigure the network site 210 to implement the selected mitigation actions. After the instructions have been generated, the instructions can be transmitted from the interference mitigation tool 250 to the site configuration module 222 of the network site 210 to cause the network site 210 to alter one or more operating parameters and implement the selected mitigation actions for each of the sectors 218a-218n.

Figure 3:
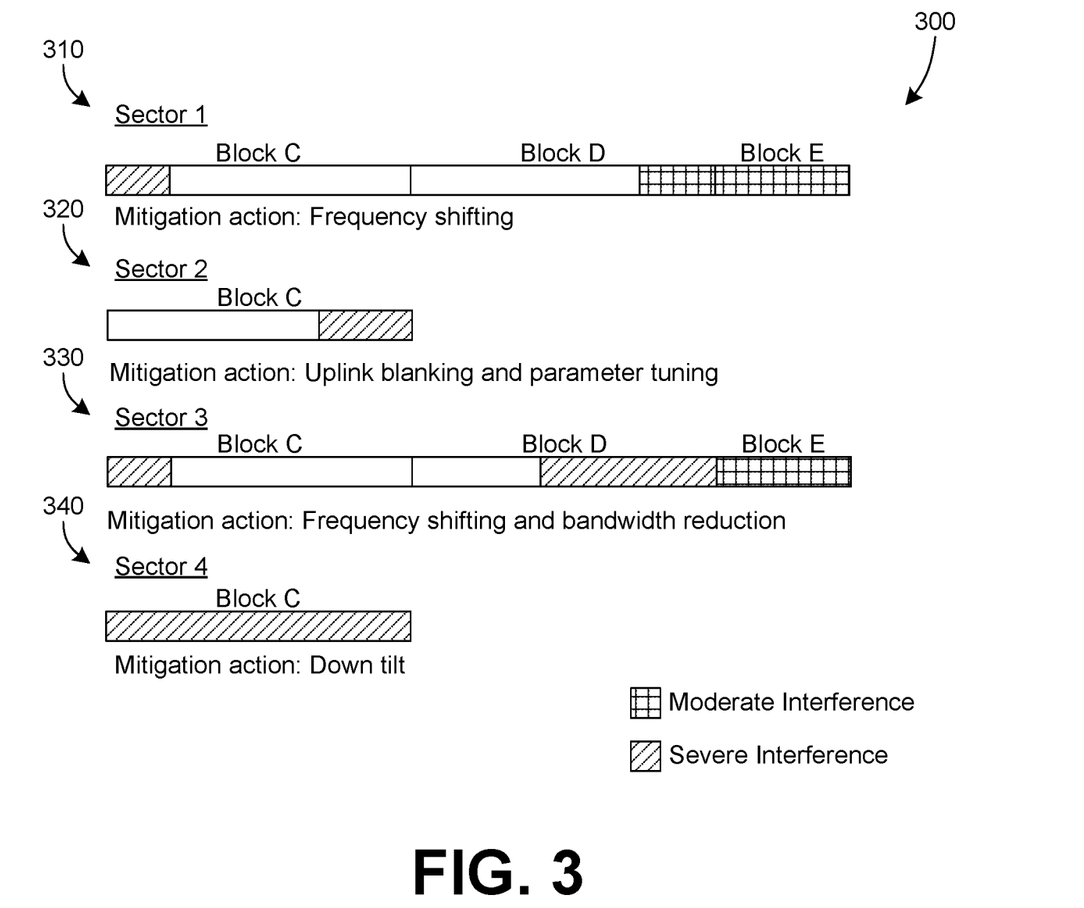
FIG. 3 is a graphical representation of an example mitigation analysis.

FIG. 3 illustrates a graphical representation of an example mitigation analysis 300. The mitigation analysis 300 is performed for each of the sectors of the network site. In the example mitigation analysis 300, the operating blocks of each of the sectors is represented and each includes indications of the interference present. For example, in Sector 1 310, Block C has severe interference that impacts the lower frequencies of Block C and the remaining frequencies of Block C indicate that there is little or no impact due to interference. The higher frequencies of Block D and all of Block E are indicated as being moderately impacted by interference. As indicated in FIG. 3, based on the interference experienced at Sector 1 310, the interference mitigation analysis selects a frequency shift for the mitigation action. The frequency shift mitigation action shifts the operating frequencies of Sector 1 310 to higher frequencies so that Sector 1 310 does not operate within the lower frequencies of Block C that are affected by the interference.

In the example of FIG. 3, Sector 2 320 experiences severe interference in the upper frequencies of Block C. The mitigation analysis selects uplink blanking and parameter tuning as the mitigation actions to be implemented for Sector 2 320 because frequency shifting is unavailable or impractical. The uplink blanking is applied to the lower frequencies of Block C so that the connected UEs do not transmit to Sector 2 320 using the frequencies impacted by interference. The parameter tuning is applied to the higher frequencies of Block C to mitigate the effects of the interference of the higher frequencies of Block C.

Sector 3 330 of FIG. 3 experiences severe interference in the lower frequencies of Block C and the higher frequencies of Block D, and moderate interference of Block E. The interference mitigation tool selects frequency shifting and bandwidth reduction as the mitigation actions. The frequency shifting will move the operating frequencies of Block C of Sector 3 330 to the upper frequencies of Block C to avoid the interference. The bandwidth reduction will reduce the capacity of Block C to prevent an undue number of UEs communicating with Sector 3 330 using Block C.

Additionally in the example of FIG. 3, Sector 4 340 experiences severe interference in Block C, the only operating block of Sector 4 340. Due to the severe interference impacting the entirety of Block C, the mitigation analysis selects down tilt as the mitigation action to be implemented. Down tilting reduces the coverage area of Sector 4 340 in an attempt to avoid the interference being received at Sector 4 340. The down tilting can include physically tilting the antenna(s) of Sector 4 340 downwards towards the ground or altering the signal reception of Sector 4 340 to electronically down tilt Sector 4 340. After the down tilting mitigation action has been implemented for Sector 4 340, the interference mitigation tool can repeat the interference mitigation to determine if Sector 4 340 still experiences the interference. If Sector 4 340 continues to experience interference throughout Block C, the interference mitigation tool can recommend sacrificing or disabling Sector 4 340 depending on the severity of the interference. If the interference continues to be severe, Sector 4 340 may be unsuitable for serving customers and the interference mitigation tool can disable Sector 4 340 to prevent UE from connecting to Sector 4 340. Sector 4 340 can be re-enabled when the interference mitigation tool determines that Sector 4 340 is no longer experiencing the severe interference that necessitated its disablement.

Figure 4:
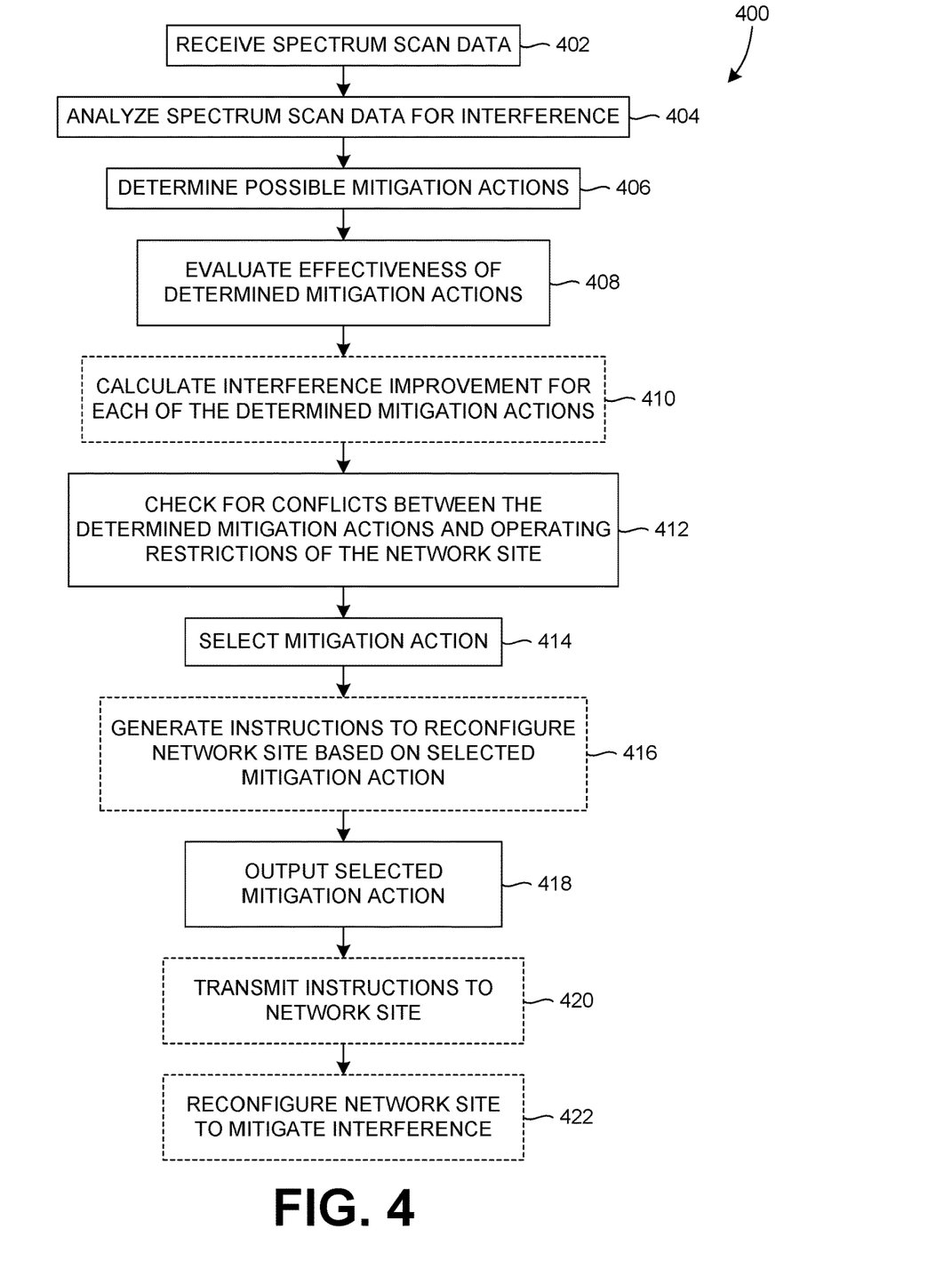
FIG. 4 is an example interference mitigation process.

FIG. 4 illustrates an example interference mitigation process 400 for a network site, such as performed by the interference mitigation tool 250 for the network site 210 of FIGS. 1 and 2. The interference mitigation process 400 can be performed for each of the sectors of the network site or for the network site overall. At 402, spectrum scan data is received. The spectrum scan data includes a frequency and power or loudness of the various radio transmissions received by a network site. The network site performs a spectrum scan to generate the spectrum scan data. The spectrum scan data can be transmitted from the network site to the interference mitigation tool.

At 404, the spectrum scan data is analyzed for interference. As previously discussed, the analysis can include identifying radio transmissions in the spectrum scan data that exceed a threshold power or loudness, indicating that the radio transmissions are interference received by the network site. The analysis of 404 can also include identifying the portions or blocks of the operating band that experience interference, classifying the severity of the interference, quantifying the interference, or other analysis of the interference indicated in the spectrum data.

At 406, possible mitigation actions can be determined. The possible mitigation actions can be determined from a list or library of all of the mitigation actions and can be based on which mitigation actions can be implemented for the network site from which the spectrum scan data was received. The determined mitigation actions can be ranked, weighted or sorted in a hierarchal order. The hierarchal order of the determined mitigation actions can be based on the impact the mitigation action will have on the operating efficiency and an effectiveness of the mitigation action in mitigating the interference. Additionally, 406 can include a consideration of whether mitigation action is necessary.

Based on the severity of the interference indicated by the analysis at 404, implementing a mitigation action may have a negligible or incremental effect on reducing or minimizing the interference. If the impact due to the interference is not severe enough or if the mitigation action will have a minimal or incremental impact on reducing the interference, it may be determined that mitigation action is unnecessary.

At 408 the possible mitigation actions are evaluated. The evaluation can include ranking or classifying the possible mitigation actions based on their effectiveness in reducing the impact of the interference experienced by the network site and the impact the mitigation action will have on the operating efficiency of the network site. The evaluation can include determining a characteristic of the effectiveness of the possible mitigation actions, such as whether a possible mitigation action is strongly effective, moderately effective, or minimally effective in mitigating the interference experienced by the network site.

At 410, optionally, the interference improvement for each of the determined mitigation actions can be calculated. Using the determined mitigation actions of 406, the effectiveness of each can be calculated or quantified to assist with selecting one or more mitigation actions to be implemented. The calculation can include determining a numerical value associated with the effectiveness of each of the mitigation action, such as a percentage improvement in mitigating the interference analyzed at 404. Additionally at 410, if a mitigation action is found to have a minimal or incremental effect on the mitigation of interference experienced by the network site, the mitigation action can be removed from the determined mitigation actions.

At 412, conflicts between the determined mitigation actions and the operating restrictions of the network site can be checked. In some cases, the implementation of one or more of the determined mitigation actions can cause the network site to violate the operating restrictions associated with the network sites. Such conflicts need to be checked and identified to prevent selecting a mitigation action that cannot be implemented. If such conflicts are identified at 410, the conflicting mitigation actions can be removed from the determined mitigation actions.

At 414, a mitigation action or actions are selected. The selected mitigation action can be selected from the determined mitigation actions based on the actions performed at 406, 408, 410 and 412. The selected mitigation action of 414 is a mitigation action that will mitigate the interference experienced by the network site and not unduly reduce the operating efficiency of the network site.

Optionally at 416, instructions can be generated to reconfigure the network site based on the selected mitigation action. The selected mitigation action can be converted into executable instructions that can cause the network site to be reconfigured to implement the selected mitigation action of 414.

At 418, the selected mitigation action can be output, such as to the network management 130 of FIGS. 1 and 2, or to another system, location or person. The party that receives the output of the selected mitigation action can determine whether to implement the mitigation action or not. The output at 418 can also include the instruction generated at 416. The output 418 with the generated instructions from 416 can be transmitted to the network site at 420. The network site can then be reconfigured at 422 based on the transmitted instructions of 420. The reconfiguration of the network site at 422 can alter one or more operating parameters of the network site to implement the selected mitigation action and mitigate the impact of the interference experienced by the network site.

Figure 5:
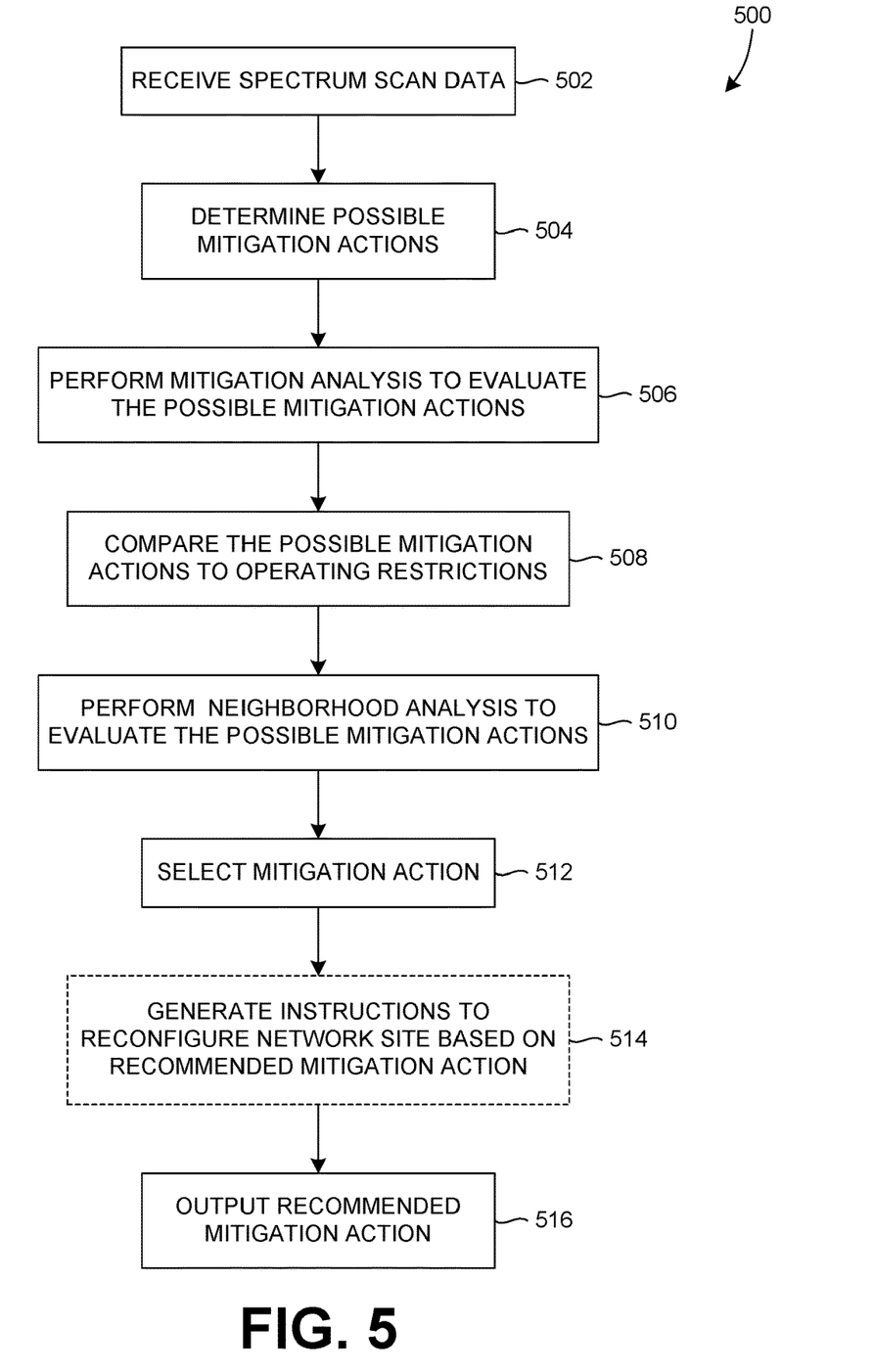
FIG. 5 is a further example interference mitigation process

FIG. 5 illustrates an example interference mitigation process 500 for a network site that is part of a neighborhood of network sites, such as performed by the interference mitigation tool 250 of FIGS. 1 and 2. The neighborhood of network sites is a group of multiple network sites that are nearby or closely located, such as a group of network sites within a geographical area. As previously discussed, the mitigation actions implemented by individual network sites may reduce the impact of the interference experienced by each of those network sites but may reduce the operating efficiency of the network within the neighborhood of network sites. The reduced operating efficiency can be caused by a variety of factors, such as the need for increased signaling between the UE and the network sites of the neighborhood due to the network sites operating on different blocks of the operating band.

The interference mitigation process 500 is performed individually for a network site of the neighborhood of network sites with a consideration for the operating parameters of the other network site of the neighborhood. While the interference mitigation process 500 is performed for each network site, multiple network sites of the neighborhood can be processed simultaneously.

At 502, the spectrum scan data is received. As previously discussed, the network site can generate the spectrum scan data based on the radio transmissions received by the network site. At 504, the possible mitigation actions are determined. The possible mitigation actions can be determined based on the spectrum scan data 502, such as if the spectrum scan data indicates the presence of interference and characteristics of the interference like a frequency and power of the interference. The possible mitigation actions determined at 504 can include one or more of the previously discussed mitigation actions or other mitigation actions that can be implemented at the network site.

At 506, the possible mitigation actions are evaluated. The evaluation can include ranking or classifying the possible mitigation actions based on their effectiveness in reducing the impact of the interference experienced by the network site and the impact the mitigation action will have on the operating efficiency of the network site. The evaluation of 506 can also include calculating or quantifying the effectiveness of the possible mitigation actions in reducing the impact of the interference experienced by the network site. As part of the evaluation of 506, the possible mitigation actions can be reduced by removing mitigation actions that are do not meet a threshold of effectiveness in reducing the impact of the interference experienced by the network site. At 508, the possible mitigation actions can be compared to the operating restrictions of the network site. As previously discussed, the implementation of some mitigation actions can cause the network site to violate an operating restriction. The comparison at 508 allows such mitigation actions to be removed from the possible mitigation actions.

At 510, the neighborhood analysis is performed to evaluate the possible mitigation actions. The neighborhood analysis can include receiving and processing information regarding the operating characteristics of the other network sites of the neighborhood, such as the operating blocks of the other network sites. Based on the operating parameters of the other network sites, the neighborhood analysis can alter the weight or rank of the possible mitigation actions. The alteration of the weight or rank of the possible mitigation actions can be based on how similar the operating parameters of the network site will be with the other network sites of the neighborhood if the network site was to implement the possible mitigation actions. For example, the majority of the network sites of the neighborhood can operate on the same block of the operating band. A possible mitigation action for the network site can be a block shift mitigation action the causes the network site to operate on a block that is different than the majority of the network sites of the neighborhood. The weight or rank of the block shift mitigation action can be reduced since operating the network site on a block different from the majority of network sites will reduce the operating efficiency of the network within the neighborhood of sites. Additionally, the neighborhood analysis 510 can be used to better align the operating parameters of the network sites of the neighborhood. For example, the interference mitigation process 500 can be performed for multiple network sites of the neighborhood simultaneously and the neighborhood analysis 510 of the process of each of the network sites can be performed together to better align the operating parameters of the network sites of the neighborhood. This can cause network sites of the neighborhood to implement mitigation actions that may not be optimal for reducing the interference experienced by the network sites but does better align the neighborhood of network sites.

At 512, a mitigation action can be selected based on 506, 508, and 510. The selected mitigation action mitigates the interference experienced by the network site, and does not unduly reduce the operating efficiency of the network site or the operating efficiency of the neighborhood of network sites. In some examples, the recommended mitigation action can include disabling a sector of the network site to maintain the alignment of the operating parameters of the network site with those of the neighborhood of network sites. While disabling a sector of the network site does reduce the operating efficiency of the network site, it may also improve the operating efficiency of the neighborhood of network sites.

At 514, instructions can be optionally generated to reconfigure the network site based on the recommended mitigation action. The instructions can cause the network site to be reconfigured to implement the recommended mitigation action. At 516, the recommended mitigation action can be output, such as to the network management 130 of FIGS. 1 and 2, or to another system, location or user. The output 514 can also include transmitting the instructions generated at 512 to the network site to cause the network site to be reconfigured to implement the recommended mitigation action The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

The invention claimed is:

1. An interference mitigation tool for a telecommunications network having multiple network sites, each of the multiple network sites having a site configuration module, the interference mitigation tool comprising:
a spectrum analysis module configured to:
receive spectrum scan data from each of the multiple network sites, and
analyze the spectrum scan data of each of the multiple network sites to determine a presence of interference;
a mitigation module, comprising:
a mitigation action library including a mitigation action;
an operating restriction associated with the multiple network sites; and
a mitigation analysis configured to:
in response to determining the presence of interference in one or more of the multiple network sites, evaluate an effectiveness of the mitigation action on a neighborhood of the multiple network sites, and
apply the mitigation action to two or more of the multiple network sites based on the operating restriction and the evaluated effectiveness of the mitigation action on the neighborhood of the multiple network sites; and
an output configured to output instructions for the site configuration module of the two or more of the multiple network sites to which the mitigation action is applied in the neighborhood of multiple network sites, the instructions causing the two or more of the multiple network sites to which the mitigation action is applied to independently alter an operating parameter of the respective two or more of the multiple network sites in the neighborhood based on the applied mitigation action.

2. The system of claim 1, wherein each of the multiple network sites include one or more sectors, and wherein the spectrum analysis module is further configured to:
receive spectrum scan data from each of the sectors in each of the multiple network sites, and
analyze the spectrum scan data from each of the sectors in each of the multiple network sites to determine the presence of interference in the respective sectors.

3. The system of claim 1, wherein the spectrum analysis module is further configured to analyze the spectrum scan data of each of the multiple network sites to determine the presence of interference in one of the multiple network sites.

4. The system of claim 1, wherein the spectrum analysis module is further configured to analyze the spectrum scan data of each of the multiple network sites to determine presence of interference in multiple of the multiple network sites.

5. The system of claim 1, wherein the spectrum scan data for each of the multiple network sites includes data relating to one or more radio transmissions received by the respective network site and a frequency and a power associated with each of the one or more radio transmissions.

6. The system of claim 5, wherein the spectrum analysis module is further configured to determine the presence of interference in the spectrum scan data for each of the multiple network sites based on the frequency and the power associated with each of the one or more radio transmissions received by the respective network sites.

7. The system of claim 1, wherein the mitigation analysis is further configured to:
determine a characteristic associated with mitigating the interference present in the spectrum scan data of each of the respective multiple network sites, the characteristic determined for each of the plurality of mitigation actions; and
evaluate the effectiveness of each of the plurality of mitigation actions for each of the multiple network sites.

8. The system of claim 1, wherein the mitigation analysis is further configured to:
calculate an effectiveness for each of the plurality of mitigation actions for each of the respective multiple network sites; and
apply the mitigation action based on the operating restriction and the evaluated effectiveness of the mitigation action for each of the multiple network sites.

9. The system of claim 1, wherein the interference mitigation tool further includes a site configuration instruction module configured to generate the instructions to independently alter the operating parameters of the two or more of the multiple network sites in the neighborhood based on the applied mitigation action.

10. The system of claim 1, wherein the interference mitigation tool further includes a site configuration instruction module configured to generate the instructions to independently alter the operating parameters of a portion of the the multiple network sites in the neighborhood based on the applied mitigation action.

11. A method of mitigating interference in a telecommunications networks with multiple network sites, each of the multiple network sites having a site configuration module, the method comprising:
receiving spectrum scan data for an operating band of each of the respective multiple network sites;
analyzing the spectrum scan data for the operating band of each of the respective multiple network sites to determine a presence of interference in one or more of the multiple network sites;
in response to determining the presence of interference in one or more of the multiple network sites, evaluating an effectiveness of a mitigation action on a neighborhood of the multiple network sites, and
applying the mitigation action to two or more of the multiple network sites based on an operating restriction and the evaluated effectiveness of the mitigation action on the neighborhood of the multiple network sites;
outputting instructions for the site configuration module of the two or more of the multiple network sites in the neighborhood to independently alter an operating parameter of the respective two or more of the multiple network sites in the neighborhood based on the applied mitigation action.

12. The method of claim 11, further comprising:
calculating an interference improvement for the determined mitigation action, and
applying the mitigation action based on the operating restriction, the evaluated effectiveness of the mitigation action, and the calculated interference improvement.

13. The method of claim 11, further comprising outputting instructions for the site configuration module of each of the multiple network sites in the neighborhood to independently alter an operating parameter of all of the respective multiple network sites based on the applied mitigation action.

14. The method of claim 13, further comprising outputting the instructions for the site configuration module of the two or more of the multiple network sites in the neighborhood to independently reconfigure the respective operating parameter of the two or more of the multiple network sites in the neighborhood based on the applied mitigation action.

15. The method of claim 11, further comprising outputting instructions for the site configuration module of a portion of the multiple network sites in the neighborhood that includes the two or more of the multiple network sites to independently alter an operating parameter of the portion of the respective multiple network sites in the neighborhood based on the applied mitigation action.

16. The method of claim 15, further comprising outputting the instructions for the site configuration module of the portion of the multiple network sites in the neighborhood to independently reconfigure the operating parameter of the portion of the respective multiple network sites based on the applied mitigation action.

17. The method of claim 11, wherein outputting the instruction to the multiple respective network sites to implement the applied mitigation action includes transmitting the instruction to each of the multiple network sites.

18. The method of claim 17, wherein transmitting the instruction to each of the multiple network sites includes reconfiguring the two or more of the respective network sites based on the instruction by altering one or more operating parameters of the two or more of the multiple network sites to implement the selected mitigation action.

19. The method of claim 11, wherein analyzing the spectrum scan data to determine the presence of interference includes identifying a radio transmission in the spectrum scan data, the radio transmission having a frequency and a power, and determining the presence of interference based on the power of the radio transmission exceeding a threshold power.

20. The method of claim 19, wherein analyzing the spectrum scan data to determine the presence of interference further includes one or more of classifying or quantifying the interference determined to be present in the spectrum scan data.

* * * * *